United States Patent
Morgan

[15] 3,663,039
[45] May 16, 1972

[54] CONVERTER LOCK BAR

[72] Inventor: Charles W. Morgan, Albuquerque, N. Mex.
[73] Assignee: M M & W., Inc.
[22] Filed: Oct. 24, 1969
[21] Appl. No.: 869,055

[52] U.S. Cl..........................280/408, 280/446 B, 280/474, 280/423 A
[51] Int. Cl.......................................................B62d 53/00
[58] Field of Search..................280/446 B, 474, 476, 423 A, 280/442, 432, 408

[56] References Cited

UNITED STATES PATENTS

| 2,590,962 | 4/1952 | Gurton et al. | 280/408 |
| 3,421,777 | 1/1969 | Barker et al. | 280/423 A |
| 3,502,351 | 3/1970 | Gray | 280/446 B |

FOREIGN PATENTS OR APPLICATIONS

| 1,478,852 | 3/1967 | France | 280/474 |

Primary Examiner—Leo Friaglia
Attorney—Clarence A. O'Brien and Harvey B. Jacobson

[57] ABSTRACT

A telescoping arm assembly for connection between the rear end of a vehicle and a wheeled dolly trailed behind the vehicle. The arm assembly may be secured in predetermined extended position to prevent angular displacement of the dolly about an upstanding axis relative to the vehicle while the vehicle is being backed and the telescoping arm assembly may be subsequently released for ready telescoping during turning movement of the vehicle relative to the dolly or disconnected from the vehicle and supported from the dolly when the vehicle is to be moved in a forward direction and trailed as a trailer.

7 Claims, 8 Drawing Figures

Charles W. Morgan
INVENTOR

Charles W. Morgan
INVENTOR

BY Clarence A. O'Brien
and Harvey B. Jacobson
Attorneys

3,663,039

CONVERTER LOCK BAR

The converter lock bar has been designed to provide a means whereby a semi-trailer dolly in trailing position behind a vehicle may be backed, upon rearward movement of the vehicle, beneath the forward end of a semi-trailer.

Some states allow full trailers to be towed behind semi-trailers and in many instances such a full trailer comprises no more than a conventional semi-trailer with a wheeled dolly removably anchored to the fifth wheel pin of the semi-trailer through a conventional fifth wheel assembly supported from the dolly. These dollies are provided with forwardly projecting tongues whereby they may be readily swivelly attached to the rear ends of semi-trailers whereby a semi-trailer and full trailer combination vehicle may be formed.

However, when wishing to couple a semi-trailer to be trailed as a full trailer behind another semi-trailer, it is first necessary to move the wheeled dolly beneath the forward end of the semi-trailer which is to be trailed as a full trailer. Thereafter, it is then necessary to back the semi-trailer which is to tow the full trailer toward the dolly and in correct position relative thereto whereby the towing tongue of the dolly may be connected to the tow hitch provided therefor on the semi-trailer which is to tow the full trailer.

It is very difficult to manually roll the wheeled dolly in correct position beneath the forward end of the semi-trailer which is being converted to a full trailer. On the other hand, it is substantially impossible for the wheeled dolly to be backed beneath the forward end of the full trailer while the dolly is connected to the rear end of the semi-trailer inasmuch as the driver of the tractor pulling the semi-trailer will not be able to control the direction in which the dolly will roll while backing the tractor and semi-trailer.

However, the lock bar of the instant invention has been provided for connection between the rear of the semi-trailer and the wheeled dolly in a manner such that the dolly may not be pivoted relative to the semi-trailer. By utilizing the lock bar, the tractor and semi-trailer as well as the wheeled dolly may be readily backed inasmuch as the lock bar will prevent the wheeled dolly from swinging relative to the rear end of the semi-trailer and thus make the wheeled dolly a part of the semi-trailer for ease in backing the semi-trailer and the wheeled dolly into position with the wheeled dolly beneath the forward end of the semi-trailer which is to be transformed into a full trailer.

The main object of this invention is to provide a lock bar connectible between a semi-trailer and a wheeled dolly trailed therebehind for the purpose of locking the wheeled dolly against angular displacement about an upstanding axis relative to the semi-trailer.

Another object of this invention is to provide a converter lock bar including telescopingly engaged opposite end portions and means for releasably locking the opposite end portions in predetermined extended positions relative to each other.

Still another object of this invention, in accordance with the immediately preceding object, is to provide a converter lock bar constructed in a manner whereby it may be releasably locked in a plurality of extended positions.

Yet another object of this invention is to provide a converter lock bar in accordance with the immediately preceding object whose locking mechanism may be actuated and deactuated from a remote location.

A final object of this invention to be specifically enumerated herein is to provide a converter lock bar which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
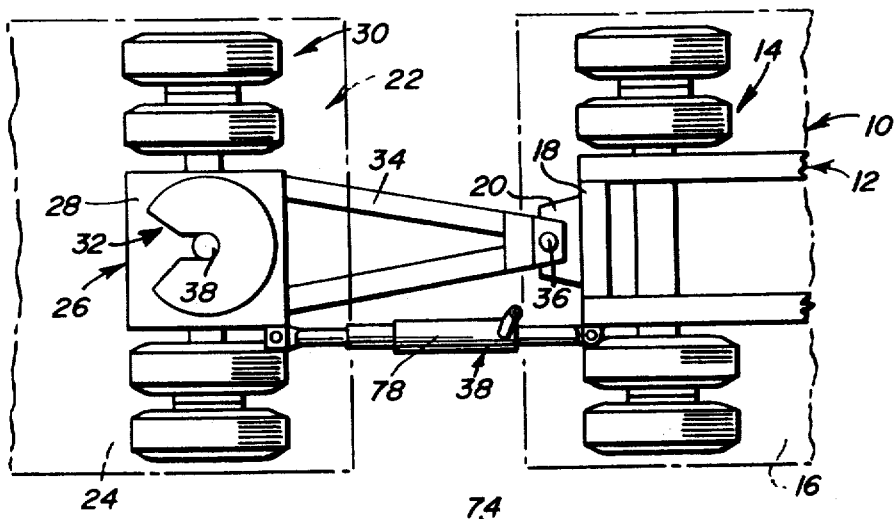
FIG. 1 is a fragmentary plan schematic view illustrating the manner in which the converter lock bar may be connected between the rear end of a semi-trailer and the frame portion of a wheeled dolly to be positioned beneath the forward end of a trailing semi-trailer.
Figure 2:
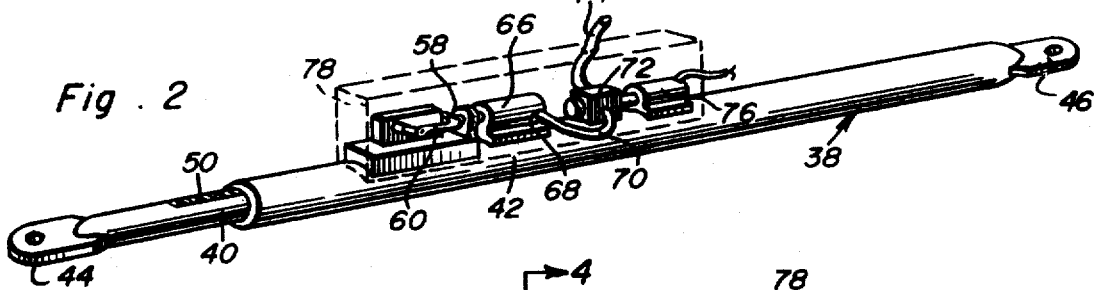
FIG. 2 is an enlarged perspective view of the lock bar illustrated in FIG. 1.

Referring now more specifically to the drawings the numeral 10 generally designates a semi-trailer whose forward end is supported from a tractor (not shown). The semi-trailer 10 includes a frame referred to in general by the reference numeral 12 from which a rear axle assembly 14 is supported and a load box or body 16 may be mounted on the frame 12. In addition, the rear transverse member 18 of the frame 12 is provided with a tow hitch 20.

A semi-trailer converted to a full trailer is referred to in general by the reference numeral 22 and includes a load body 24. The semi-trailer 22 is converted to a full trailer by the utilization of a wheeled dolly or converter referred to in general by the reference numeral 26. The dolly 26 includes a frame portion 28 provided with a wheeled axle assembly referred to in general by the reference numeral 30 and a conventional fifth wheel structure referred to in general by the reference numeral 32 is supported from the frame portion 28 which also includes a forwardly projecting towing tongue 34 whose forward end is universally attached to the tow hook 20 as at 36. Of course, the semi-trailer 22 includes a fifth wheel pin 38 which is releasably anchored to the fifth wheel assembly 32 and accordingly, the trailer 22 is converted to a full trailer for towing behind the semi-trailer 16.

The foregoing description may be considered as conventional and it is to be understood that it is also conventional to convert a semi-trailer to a full trailer for trailing behind a semi-trailer.

The lock bar of the instant invention is referred to in general by the reference numeral 38 and constitutes an elongated telescoping arm assembly including opposite end portions 40 and 42 telescopingly engaged with each other. The end portion 42 is tubular and the remote ends of the end portions 40 and 42 are provided with apertured attaching plates 44 and 46, respectively, by which the lock bar may be secured between the semi-trailer 10 and the trailer 22.

The end portion 42 has a radial opening 48 formed therein and the end portion 40 is provided with longitudinally spaced rack gear teeth 50 which are registered with the opening 48. A lock block 52 is slidably mounted in the opening 48 for movement therethrough and includes teeth 54 which are engageable with the rack gear teeth 50 when the lock block 52 is displaced inwardly to the position thereof illustrated in FIG. 3 of the drawings.

Figure 3:
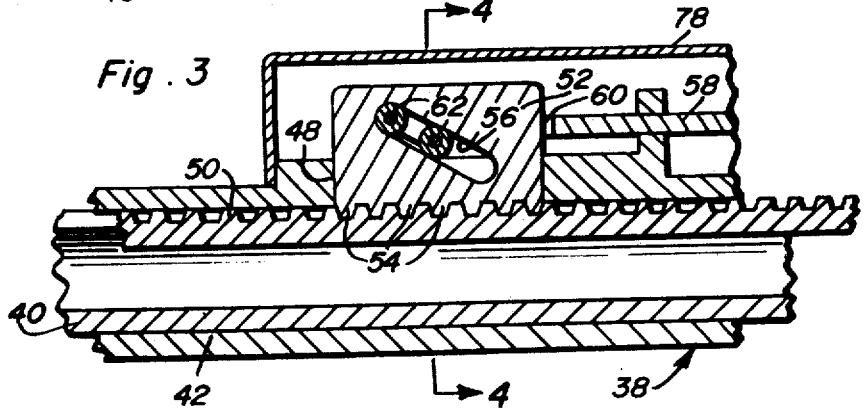
FIG. 3 is a fragmentary enlarged longitudinal vertical sectional view taken substantially upon a plane passing through the center of the lock bar illustrated in FIG. 2 and showing the manner in which the lock bar may be actuated and deactuated from a remote location.
Figure 4:
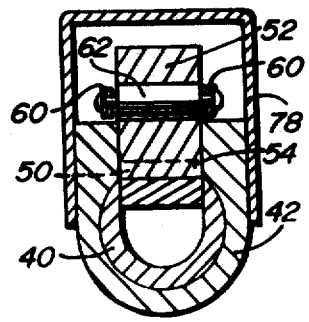
FIG. 4 is a fragmentary transverse sectional view taken substantially upon the plane indicated by the section line 4—4 of FIG. 3.
Figure 5:
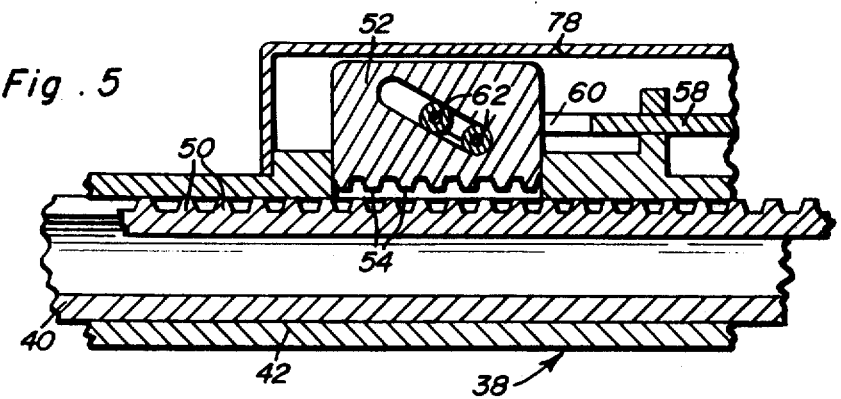
FIG. 5 is an enlarged fragmentary longitudinal vertical sectional view similar to FIG. 3 but illustrating the locking block in a retracted position with the opposite end portions of the lock bar free to shift longitudinally relative to each other.

The lock block 52 is provided with an inclined slot 56 extending therethrough and an elongated actuator rod 58 is provided and includes a bifurcated end portion between whose furcations 60 the lock block 52 is received. In addition, a plurality of rollers 62 are journaled between the furcations 60 and extend through the slot 56 in the manner illustrated in FIGS. 3 and 4 of the drawings whereby the actuating rod 58 may be shifted to the left as viewed in FIG. 5 of the drawings in order to lower the lock block 52 to the position thereof illustrated in FIG. 3 of the drawings and shifted to the right as illustrated in FIG. 3 of the drawings in order to retract the lock block 52 from the operative position thereof illustrated in FIG. 3 of the drawings to the inoperative position thereof illustrated in FIG. 5 of the drawings. The actuating rod 58 comprises an extended end portion of a piston rod portion of an air cylinder 66 which is supported from the outer surface of the end portion 42.

The air cylinder 66 includes an inlet 68 to which the discharge end of an air line 70 is connected and the inlet end of the air line 70 is connected to the outlet port of an air valve 72 to which air under pressure is supplied through a supply line 74. The air valve 72 is actuated by means of an electric solenoid 76 supported from the end portion 42 and a removable housing 78 is provided and encloses the lock bar 52, the air cylinder 66, the air valve 72, and the solenoid 76. Upon actuation of the solenoid 76, the air valve 72 is opened and air under pressure is delivered through the line 70 to the air cylinder 66 whereby the actuating rod 58 is extended and the lock block 52 is lowered from the position thereof illustrated in FIG. 5 of the drawings to the locked position thereof illustrated in FIG. 3 of the drawings. When the solenoid 76 is deactuated, the air valve 72 is closed and a spring (not shown) in the air cylinder 66 functions to retract the actuating rod 58 and thereby raise the lock block 52 from the locked position thereof illustrated in FIG. 3 of the drawings to the inoperative position thereof illustrated in FIG. 5 of the drawings.

From FIG. 1 of the drawings it may be seen that one of the remote ends of the end portions 40 and 42 is pinned or pivotally attached to the left hand rear corner of the frame 12 and that the other remote end is pinned or pivotally attached to the frame portion 28. Accordingly, the wheeled dolly or converter 26 may not pivot relative to the semi-trailer frame 12 when the lock block 52 is in the position thereof illustrated in FIG. 3 of the drawings. Thus, the semi-trailer 10 may be backed with the wheeled dolly 26 retained in position therebehind for movement beneath the forward end of the trailer 22 and coupling with the fifth wheel pin 38 of the trailer 22.

Figure 6:
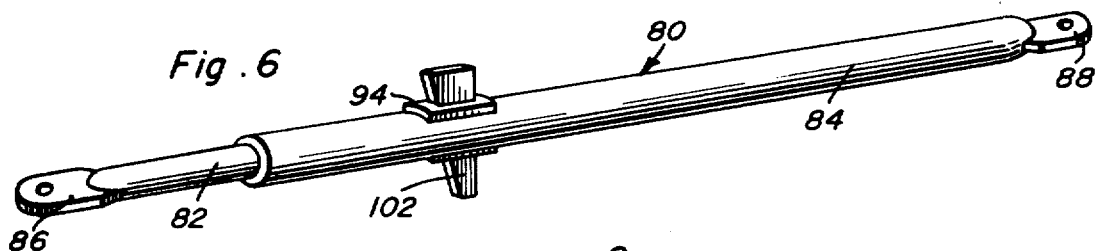
FIG. 6 is a perspective view of a simplified form of lock bar.
Figure 7:
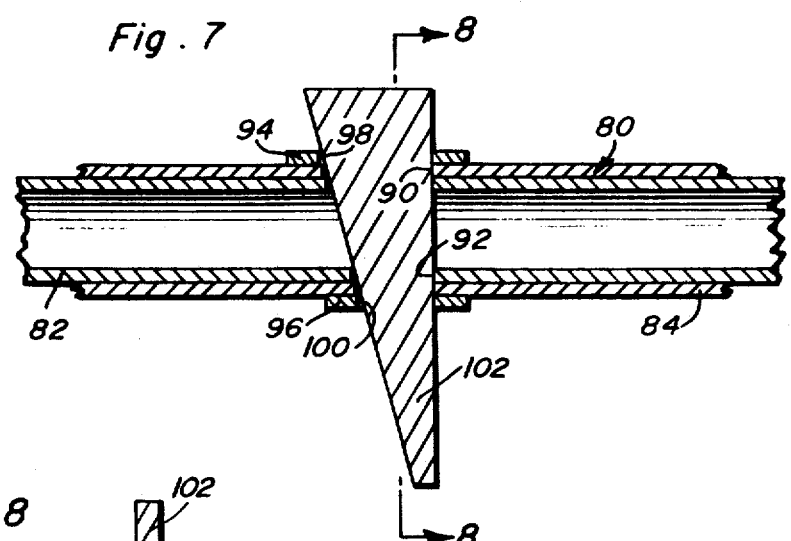
FIG. 7 is an enlarged fragmentary vertical longitudinal sectional view taken substantially upon a plane passing through the center portion of the lock bar illustrated in FIG. 6.
Figure 8:
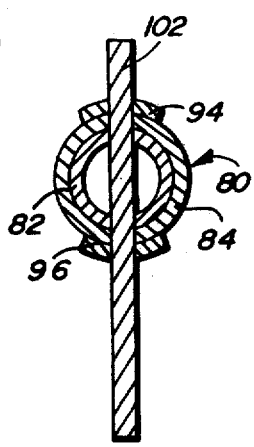
FIG. 8 is a fragmentary transverse vertical sectional view taken substantially upon the plane indicated by the section line 8—8 of FIG. 7.

With attention directed now more specifically to FIGS. 6 through 8 of the drawings, there may be seen a modified form of locking bar referred to in general by the reference numeral 80. The locking bar 80 is structurally and operationally similar to the locking bar 38 in that it includes telescopingly engaged opposite end portions 82 and 84 corresponding to the end portions 40 and 42. The remote ends of the end portions 82 and 84 include apertured plates 86 and 88 corresponding to the plates 44 and 46 and the outer tubular end portion 84 as well as the inner end portion 42 are provided with transverse openings formed therethrough. The outer end portion 84 has an opening 90 formed therethrough and the inner end portion 82 has an opening 92 formed therethrough. In addition, reinforcing plates 94 and 96 are secured to the upper and lower surface portions of the outer end portion 84 and have openings 98 and 100 formed therethrough which are registrable with the openings 90 and 92.

An elongated wedge member 102 is provided and receivable through the openings 90, 92, 94, and 96 in the manner illustrated in FIG. 7 of the drawings when these openings are registered in order to lock the end portions 82 and 84 against extension or retraction relative to each other. Thus, when the elongated wedge 102 is in position, the locking bar 80 is of a fixed length.

The advantage of the locking bar 38 over the locking bar 80 is that the former may be locked and unlocked from a remote location such as the cab of the tractor to which the semi-trailer 10 is coupled. Of course, when it is desired to remove or replace the locking wedge 102, this must be done by hand.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a wheeled dolly including a rigid forwardly projecting tongue portion pivotally attached at its forward end to the rear end of a vehicle for oscillation about a first upstanding axis and including a rearwardly opening slotted fifth wheel plate for releasable pivotal coupling of said dolly to the fifth wheel pin of a semi-trailer upon rearward movement of said dolly beneath the elevated front end of said semi-trailer, an elongated telescoping arm assembly including opposite end portions guidingly supported relative to each other for relative extension and retraction, lock means operative to releasably secure said end portions in adjusted extended positions, one of the remote ends of said end portions being pivotally secured to said dolly for oscillation about a second upstanding axis parallel the first axis and the other of said remote ends being pivotally secured to said vehicle for oscillation about a third upstanding axis.

2. The combination of claim 1 wherein said end portions include adjacent ends telescopingly engaged with each other.

3. The combination of claim 2 wherein said lock means includes registrable openings formed through the telescoped ends of said end portions and an elongated lock member having one end portion removably lengthwise inserted through said registrable openings.

4. In combination with a wheeled dolly including a forwardly projecting tongue portion universally attached at its forward end to the rear end of a vehicle, an elongated telescoping arm assembly including opposite end portions guidingly supported relative to each other for relative extension and retraction, lock means operative to releasably secure said end portions in adjusted extended positions, one of the remote ends of said end portions being pivotally secured to said dolly for oscillation about an upstanding axis and the other of said remote ends being pivotally secured to said vehicle for oscillation about an upstanding axis, said end portions including adjacent ends telescopingly engaged with each other, the inner telescoped end portion including longitudinally extending rack gear teeth, the outer telescoped end portion being tubular and having a generally radial opening formed therein registered with said teeth, said lock means including a lock block guidingly supported from said outer end portion for movement through said opening, said lock block including teeth means engageable with said rack gear teeth upon inward displacement of said lock block through said opening.

5. The combination of claim 4 wherein said dolly has a fifth wheel supported therefrom adapted to have the front end of a semi-trailer removably supported therefrom.

6. The combination of claim 4 including motor means supported from said arm assembly and operatively connected to said lock block for shifting the latter through said opening.

7. An elongated telescoping arm assembly for connection between the rear end of a vehicle and a wheeled dolly towed behind said vehicle, said arm assembly including opposite end portions guidingly supported relative to each other for relative extension and retraction, lock means operative to releasably secure said end portions in adjusted extended positions, one of the remote ends of said end portions being adapted to be pivotally secured to said dolly for oscillation about an upstanding axis and the other of said remote ends being adapted to be pivotally secured to said vehicle for oscillation about an upstanding axis, said end portions including adjacent ends telescopingly engaged with each other, the inner telescoped end portion including longitudinally extending rack gear teeth, the outer telescoped end portion being tubular and having a generally radial opening formed therein registered with said teeth, said lock means including a lock block guidingly supported from said outer end portion for movement through said opening, said lock block including teeth means engageable with said rack gear teeth upon inward displacement of said lock block through said opening.

* * * * *